United States Patent
Heininger et al.

(10) Patent No.: US 8,366,437 B2
(45) Date of Patent: Feb. 5, 2013

(54) ANGLE LINK PIVOT BRACKET FOR WHEEL

(75) Inventors: Ammon Heininger, New Freedom, PA (US); Marshall M. Miller, Wrightsville, PA (US); Larry M. Taylor, Landisville, PA (US)

(73) Assignee: Graham Packaging Company, L.P., York, PA (US)

( * ) Notice: Subject to any disclaimer, the term of this patent is extended or adjusted under 35 U.S.C. 154(b) by 305 days.

(21) Appl. No.: 12/897,047

(22) Filed: Oct. 4, 2010

(65) Prior Publication Data

US 2012/0082749 A1 Apr. 5, 2012

(51) Int. Cl.
*B29C 49/42* (2006.01)
*B29C 49/56* (2006.01)

(52) U.S. Cl. .......... 425/540; 248/214; 425/541

(58) Field of Classification Search ........... 425/540, 425/541; 248/214
See application file for complete search history.

(56) References Cited

U.S. PATENT DOCUMENTS

| | | | |
|---|---|---|---|
| 3,421,886 A * | 1/1969 | Schelleng | 420/22 |
| 3,932,084 A | 1/1976 | Reilly | |
| 4,046,498 A | 9/1977 | Appel et al. | |
| 4,522,608 A * | 6/1985 | Joyner | 464/134 |
| 4,606,717 A * | 8/1986 | Polak et al. | 425/541 |
| 4,859,397 A | 8/1989 | Peters | |
| 4,867,197 A | 9/1989 | Ritter et al. | |
| 4,919,607 A * | 4/1990 | Martin et al. | 425/540 |
| 4,943,228 A | 7/1990 | Reymann et al. | |
| 4,946,366 A | 8/1990 | Dundas et al. | |
| 5,078,948 A | 1/1992 | Troutman et al. | |
| 5,551,862 A * | 9/1996 | Allred, Jr. | 425/541 |
| 5,681,596 A * | 10/1997 | Mills et al. | 425/541 |
| 5,705,121 A * | 1/1998 | Allred, Jr. | 264/540 |
| 7,611,657 B2 * | 11/2009 | Klinedinst et al. | 425/540 |
| 7,766,645 B2 | 8/2010 | Legallais | |
| 2009/0085243 A1 | 4/2009 | Taylor et al. | |

FOREIGN PATENT DOCUMENTS

| | | |
|---|---|---|
| CN | 200977723 | 11/2007 |
| DE | 102005029916 | 3/2007 |
| WO | WO92/03276 | 3/1992 |
| WO | WO2009/059091 | 5/2009 |

* cited by examiner

*Primary Examiner* — Robert B Davis
(74) *Attorney, Agent, or Firm* — Stradley Ronon Stevens & Young, LLP

(57) ABSTRACT

A bracket for linking guide rods to a wheel of a vertical blow molding machine and a system for blow molding containers and a mechanism for opening and closing a pair of mold halves linked to the wheel of the vertical blow molding machine using the bracket, comprising a first portion and a second portion made of iron, a plurality of pivot apertures, and a plurality of guide rod apertures for receiving the guide rods.

20 Claims, 3 Drawing Sheets

ANGLE LINK PIVOT BRACKET FOR WHEEL

TECHNICAL FIELD

The invention is directed to extrusion blow molding. More particularly, the invention is directed to an apparatus for extrusion blow molding polyethylene terephthalate.

BACKGROUND OF THE INVENTION

Polymer resins, such as polyethylene terephthalate (PET), are widely used in the packaging industry. PET is a linear, thermoplastic polyester resin. The myriad of advantages of PET include toughness, clarity, good barrier properties, light weight, design flexibility, chemical resistance, and good shelf-life performance. Furthermore, PET is environmentally friendly because it can often be recycled. These characteristics of PET make it a popular material in the manufacturing of containers, for example, beverage bottles.

There are a variety of production methodologies to produce PET containers. For example, injection stretch blow molding is commonly used to make PET bottles. Of the various methodologies, one-piece PET containers having an integrated handle are commonly formed using extrusion blow molding (EBM). The EBM process includes extruding a polymer resin in a softened state through an annular die to form a molten hollow tube (also called a "parison"). The molten parison is placed in a hollow blow mold having a cavity corresponding to the desired shape of the container being formed. Air is injected to inflate the parison against the interior walls of the blow mold. Upon contact with the walls, the parison cools rapidly and assumes the shape of the mold.

To make PET suitable for EBM, PET manufacturers have developed special grades of PET also referred to as extrusion grade PET or "EPET." Typically, EPET is high molecular weight PET having an inherent viscosity ("I.V.") of 1.0 dl/g or greater as measured by solution viscosity.

One EBM process used to manufacture EPET containers includes a vertical rotary blow molding machine, which can have an output of, for example, over 100 bottles per minute depending on the number of cavities and molds. Vertical rotary blow molding machines index circumferentially spaced mold halves on a wheel in steps around a horizontal axis. The mold halves each capture a vertical, continuously growing parison at an extrusion station. In one type of machine, for example, the flow head extruding the parison moves up and away from the mold halves after the mold halves close to capture the parison. The parison is severed adjacent the top of the mold halves, the mold halves are moved away from the extrusion station, and a top blow pin is moved into the end of the captured parison at the top of the mold halves to seal the mold cavity and blow the parison. Subsequently, the flow head and dependent parison are lowered back to the initial position so that the new parison is in position to be captured by the next pair of mold halves. The blown parison cools as the mold halves are rotated around the machine, following which the mold halves open at an ejection station and the finished article, commonly a container, is ejected from between the mold halves. In operation, the rotary wheel can produce at least 110 bottles per minute for a 22 cavity mold machine (22 molds) rotating at a rate of 5 RPM.

In EBM processes, high clamp forces are often required and deflection of the mold halves may occur. As a result, there may also be increased part wear and subsequent mold misalignment. Accordingly, there is a need in the art for a system for extrusion blow molding EPET containers that reduces deflection and operates at high clamp forces.

BRIEF SUMMARY OF THE INVENTION

To meet these and other needs, and in view of its purposes, the invention provides an improved angle link pivot bracket for the wheel of a vertical blow molding machine. One aspect of this invention provides a bracket for linking guide rods to a wheel of a vertical blow molding machine comprising a first portion and a second portion made of iron having a tensile strength of at least 65,000 psi and a yield strength of at least 45,000 psi, a plurality of pivot apertures, each for receiving a pivot bushing having a width of 1.65 to 1.85 inches; and a plurality of guide rod apertures for receiving the guide rods.

Another aspect of the invention provides a system for blow molding containers comprising a rotatable wheel and a plurality of molds with mold halves movable between an open position and a closed position, where each mold half is linked to the wheel by a linking system having a plurality of guide rods and a pivot bracket. The pivot bracket is comprised of a first portion and a second portion made of iron having a tensile strength of at least 65,000 psi and a yield strength of at least 45,000 psi, a plurality of pivot apertures, each for receiving a pivot bushing having a width of 1.65 to 1.85 inches, and a plurality of guide rod apertures for receiving the guide rods.

Yet another embodiment of the invention provides a mechanism for opening and closing a pair of mold halves linked to a wheel of a vertical blow molding machine comprising a plurality of guide rods mounted on the wheel by a pivot bracket, first and second mold halves mounted on the guide rods, where the mold halves are movable along the guide rods toward and away from one another between an open position and a closed position, and a plurality of actuator rods for moving the mold halves between the open position and the closed position. The pivot bracket is comprised of a first portion and a second portion made of iron having a tensile strength of at least 65,000 psi and a yield strength of at least 45,000 psi, a plurality of pivot apertures, each for receiving a pivot bushing having a width of 1.65 to 1.85 inches, and a plurality of guide rod apertures for receiving the guide rods.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION OF THE INVENTION

Figure 1:
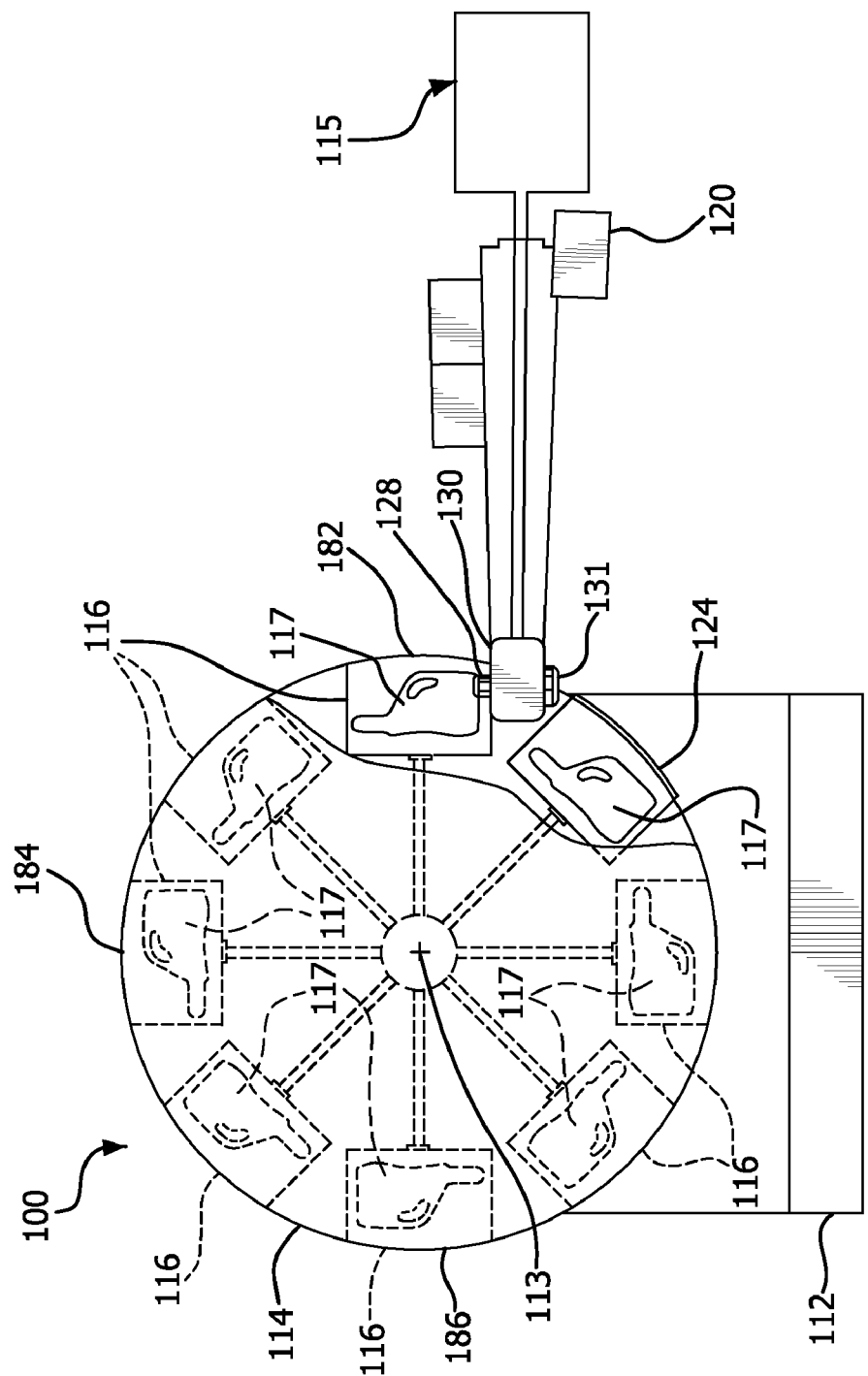
FIG. 1 is an illustration of a vertical rotary blow molding machine.

The invention is directed to an apparatus for extrusion blow molding PET, and preferably extrusion grade PET (EPET), at high output rates that are characteristic of vertical wheel-type continuous extrusion blow molding machines. Referring now to the drawings, in which like reference numbers refer to like elements throughout the various figures that comprise the drawings, FIG. 1 shows a vertical rotating blow molding machine 100. The machine 100 includes a rotatable wheel 114, supported on a base 112, and an extruder 115.

The wheel 114 has a plurality of in-line molds 116, each mold 116 having an identical inner cavity 117 defining a container. Rotary blow molding machines 100 typically have from 6 to 30 molds, but may have any number of molds. The in-line molds 116 are mounted on the wheel 114, preferably about the perimeter of the wheel 114, for rotation about a horizontally disposed rotational axis 113. The in-line molds 116 each preferably have a pair of mold halves that split the respective inner cavities 117 and that open and close at various stations during rotation about the rotational axis 113 consistent with operation of a conventional wheel-type extrusion blow molding apparatus.

Figure 2:
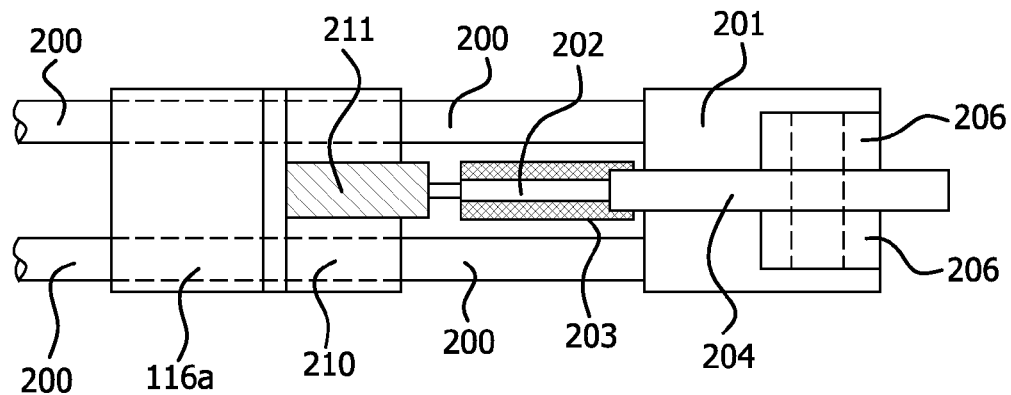
FIG. 2 is a front view of the wheel linkage system according to the invention.
Figure 3:
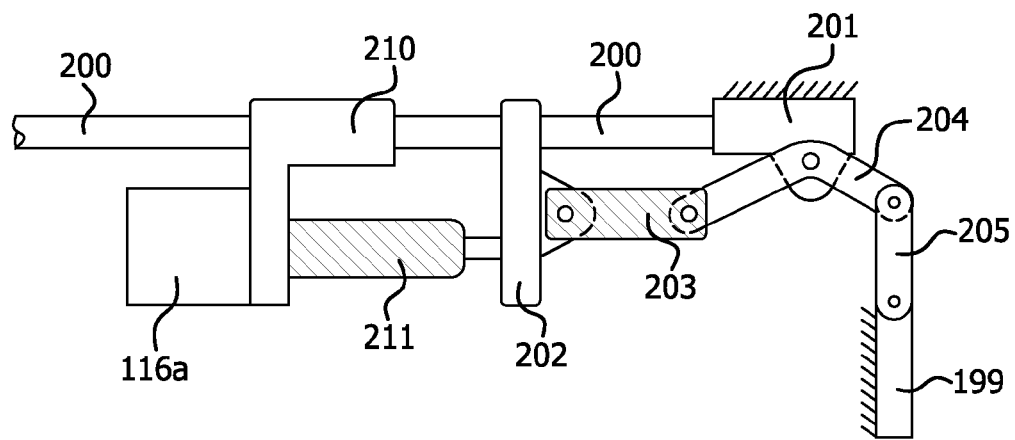
FIG. 3 is a top view of the wheel linkage system of FIG. 2.

One mold half 116a, which is shown in FIG. 2 and FIG. 3 in an open position, is mounted on a platen 210 that slides on the guide rods 200. The mold half 116a is linked to a cam follower 199 of the wheel 114 via a link system, including a pivot bracket 201. With the addition of the pivot bracket 201, the portion of the guide rods 200 that is exposed is reduced in length to about 1.5 to 2 inches, i.e., a portion of the guide rod 200 is supported by and contained within the pivot bracket 201. The shortening of the exposed guide rod 200 reduces guide rod deflection and twisting and increases the life of the guide rod 200. Reduction of guide rod deflection also results in reduction of part wear and subsequent mold misalignment. The link system may also include a spring assembly 211, which may include a spring shaft and spring discs, engaging a yoke 202 connected to the guide rod 200, a connector link 203 connected to the yoke 202, an angle link 204 connected to the connector link 203, such as a bull gear, and a cam link 205 that connects the angle link 204 to the cam follower 199. The pivot bracket 201 is connected to the angle link 204 by a pin (not shown) that passes through pivot apertures 302 (shown in FIGS. 4 and 5) of the pivot bracket 201 and the angle link 205 to create a pivot. Bushings 206 are also used as sleeves in the pivot apertures 302 to create a bearing surface, where the bushings 206 distribute bearing forces over a surface area. An actuator rod (not shown) is also connected to the cam follower 199 to move the mold halves between an open and a closed position.

Figure 4:
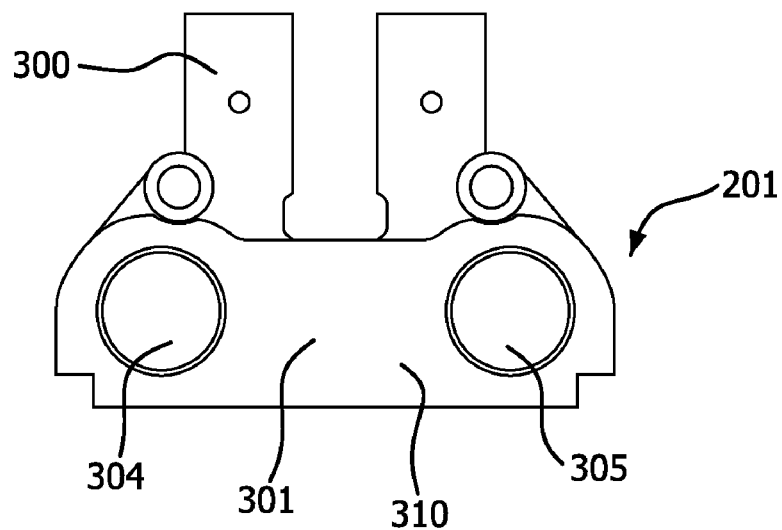
FIG. 4 is a front view of a pivot bracket according to the invention.
Figure 5:
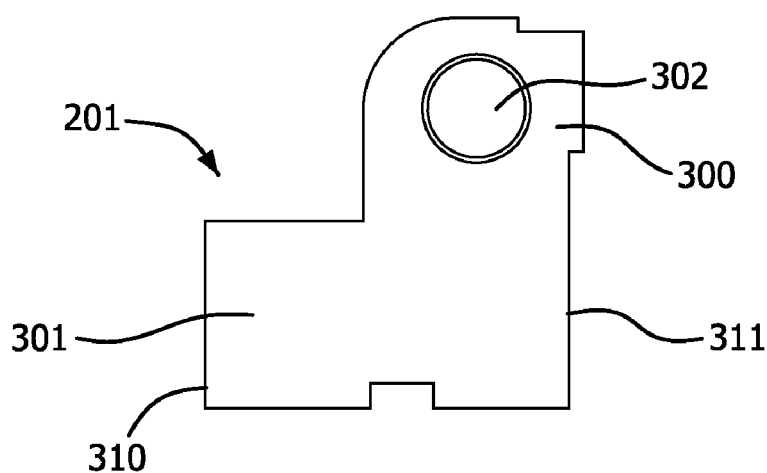
FIG. 5 is a side view of the pivot bracket shown in FIG. 4.

The pivot bracket 201 is shown in more detail in FIGS. 4 and 5. The pivot bracket 201 has a first portion 300 and a second portion 301 and a front 310 and back 311. The first portion 300 has a plurality of pivot apertures 302 adapted to receive a pivot bushing (not shown). The pivot apertures 302 have a diameter of 1.65 to 1.85 inches. Preferably, there are two pivot apertures 302 and each has a diameter of 1.75 inches. The second portion 301 has a plurality of guide rod holes 304 and 305 that receive the guide rods 200. Preferably, there are two guide rod holes 304 and 305, and the diameter of the guide rod holes 304 and 305 are slightly larger than guide rod to provide a snug fit. Preferably, the diameter of the guide rod holes ranges from 0.03 to 0.3 inches greater than the guide rod. The guide rod holes 304 and 305 are, preferably, larger at the back 311 than at the front 301, i.e., the guide rod holes 304 and 305 increase in diameter from front 310 to back 311 and have a conical shape. Many of the dimensions of the pivot bracket 201 depend upon the parts of the extrusion blow molding machine 100 and can vary from one machine to another. Regardless of the magnitude of the dimensions for the pivot bracket 201, the dimensions are predetermined before the pivot bracket 201 is cast. By "predetermined" is meant determined beforehand, so that the predetermined dimensions must be determined, i.e., chosen or at least known, in advance of casting.

The first and second portions 300 and 301 are made of iron having a tensile strength of at least 65,000 psi and a yield strength of at least 45,000 psi. Exemplary materials include 80-55-06 ductile iron and 65-45-12 ductile iron. Other suitable materials may also be used provided that they are stronger than low grade cast iron. Preferably, the first portion and the second portion comprise one contiguous piece, i.e., the pivot bracket 201 is comprised of one integral piece. By "integral" is meant a single piece or a single unitary part that is complete by itself without additional pieces, i.e., the part is of one monolithic piece formed as a unit with another part.

Referring back to FIG. 1, the extruder 115 includes a die 130 located adjacent to the wheel 114 and defining a filling station 182 at which a series of hot plastic parisons are extruded from the die 130. The die 130 is positioned such that when the in-line molds 116 are rotated, seriatim, to the filling station 182 by the wheel 114, the hot plastic parisons extruded from the die 130 may be accepted into the respective inner cavities 117 according to conventional wheel-type blow moldings techniques.

To construct a proper bottle, a parison supplied by the die 130 will typically have a varying thickness profile along a length of the parison to assure that upon the stretching experienced during blowing, the bottle will have the desired wall thickness at the various portions of the bottle. For example, it is often desirable to increase the thickness of a neck or bottom portion of a bottle relative to the remainder of the bottle to provide increased strength at those portions. Accordingly, the thickness of the parison for such a bottle may be, for example, relatively thicker at a top and bottom of the parison corresponding to a neck and bottom portion of a bottle blown from the parison.

To facilitate the production of such a profile of a parison, a pin 128 of the die 130 controls the thickness of a wall of each parison extruded. The pin 128 is coupled to a hydraulic cylinder 131 by a drawbar (not shown) such that the hydraulic cylinder 131 may vary the position of the pin 128 during extrusion of a parison. As is known to one of ordinary skill in the art, the hydraulic cylinder 131 thus raises and lowers the pin 128 to vary the thickness of the parison as it is extruded. The controller 120 controls the hydraulic cylinder 131 and thus the positioning of the pin 128. The controller 120 has programmed in it, in a manner well-known to those skilled in the art, a preset pin control program or routine to control the vertical movement of the pin 128 during extrusion of each parison and manifests control of the pin 128 via the hydraulic cylinder 131 as is also known in the art. In this manner, the pin control program determines the thickness profile of the parison. The controller 120 also induces extrusion of the parison from the die 130 upon indication from the trigger mechanism 188 that a mold is in place, that a parison is required, or both.

In operation, a parison is extruded from the die 30 and the mold halves of one of the in-line molds 116 close around the parison such that the parison is received by the inner cavity 117. Having received a parison within one of the inner cavities 117, the wheel 114, in a conventional manner, continues rotation to a blowing station 184 where air is introduced to the inner cavity 117 through a blow needle (not shown). The air from the blow needle expands the parison to conform to the shape and size of the inner cavity 117 and form a container with conventional blow molding techniques. Once blown and at least partially cooled, the container is thereafter released by opening the mold halves 116a and 116b at a release station 186. Continued operation of the wheel 114 can produce at least 75 bottles per minute.

Suitable EPET for use in accordance with the invention is, for example, POLYCLEAR® EBM PET 5505 available from Invista (Spartanburg, S.C.) and Eastman Copolymer PM32177 available from Eastman Chemical Company (Kingsport, Tenn.). However, any PET or EPET or any other material may be used.

Although the invention has been described in detail and with reference to specific embodiments, it will be apparent to one skilled in the art that various changes and modifications can be made without departing from the spirit and scope of the invention. For example, the pivot bracket 201 may be made of any material and may be used with different blow molding machines 100. Thus, it is intended that the invention covers the modifications and variations of this invention provided they come within the scope of the appended claims and their equivalents.

The invention claimed is:

1. A bracket for linking guide rods to a wheel of a vertical blow molding machine comprising:
   a first portion and a second portion made of iron having a tensile strength of at least 65,000 psi and a yield strength of at least 45,000 psi;
   a plurality of pivot apertures, each for receiving a pivot bushing having a width of 1.65 to 1.85 inches; and
   a plurality of guide rod apertures for receiving the guide rods.

2. The bracket of claim 1 wherein the iron comprises at least one of 80-55-06 ductile iron and 65-45-12 ductile iron.

3. The bracket of claim 1 wherein the pivot apertures comprise a diameter of about 1.75 inches.

4. The bracket of claim 1 wherein the first portion and the second portion comprise one contiguous piece.

5. The bracket of claim 1 wherein the guide rod apertures comprise a diameter of about 0.03 to 0.3 inches greater than a diameter of the guide rod.

6. The bracket of claim 1 wherein the plurality of pivot apertures comprises two pivot apertures.

7. The bracket of claim 1 wherein the plurality of guide rod apertures comprises two conically-shaped guide apertures.

8. A system for blow molding containers comprising:
   a rotatable wheel; and
   a plurality of molds with mold halves movable between an open position and a closed position, each mold half linked to the wheel by a linking system having a plurality of guide rods and a pivot bracket, the pivot bracket comprised of:
      a first portion and a second portion made of iron having a tensile strength of at least 65,000 psi and a yield strength of at least 45,000 psi,
      a plurality of pivot apertures, each for receiving a pivot bushing having a width of 1.65 to 1.85 inches, and
      a plurality of guide rod apertures for receiving the guide rods.

9. The system of claim 8 wherein the iron comprises at least one of 80-55-06 ductile iron and 65-45-12 ductile iron.

10. The system of claim 8 wherein the first portion and the second portion comprise one contiguous piece.

11. The system of claim 8 wherein the guide rod apertures a diameter of about 0.03 to 0.3 inches greater than a diameter of the guide rod.

12. The system of claim 8 wherein the plurality of pivot apertures comprises two pivot apertures and the plurality of guide rod apertures comprises two conically-shaped guide apertures.

13. The system of claim 8 wherein the linking system further comprises a yoke connecting the guide rods to a connector link and an angle link connecting the connector link to a cam follower of the wheel.

14. The system of claim 8 wherein the pivot bracket shortens a suspended length of the guide rods by 1.5 to 2 inches.

15. A mechanism for opening and closing a pair of mold halves linked to a wheel of a vertical blow molding machine comprising:
   a plurality of guide rods, the guide rods mounted on the wheel by a pivot bracket, the pivot bracket comprised of:
      a first portion and a second portion made of iron having a tensile strength of at least 65,000 psi and a yield strength of at least 45,000 psi,
      a plurality of pivot apertures, each for receiving a pivot bushing having a width of 1.65 to 1.85 inches, and
      a plurality of guide rod apertures for receiving the guide rods;
   first and second mold halves mounted on the guide rods, the mold halves being movable along the guide rods toward and away from one another between an open position and a closed position; and
   a plurality of actuator rods for moving the mold halves between the open position and the closed position.

16. The mechanism of claim 15 wherein the iron comprises at least one of 80-55-06 ductile iron and 65-45-12 ductile iron.

17. The mechanism of claim 15 wherein the first portion and the second portion comprise one contiguous piece.

18. The mechanism of claim 15 wherein the guide rod apertures a diameter of about 0.03 to 0.3 inches greater than a diameter of the guide rod.

19. The mechanism of claim 15 wherein the plurality of pivot apertures comprises two pivot apertures and the plurality of guide rod apertures comprises two conically-shaped guide apertures.

20. The mechanism of claim 15 wherein the pivot bracket shortens a suspended length of the guide rods by 1.5 to 2 inches.

* * * * *

UNITED STATES PATENT AND TRADEMARK OFFICE
CERTIFICATE OF CORRECTION

PATENT NO. : 8,366,437 B2  
APPLICATION NO. : 12/897047  
DATED : February 5, 2013  
INVENTOR(S) : Heininger et al.

Page 1 of 1

It is certified that error appears in the above-identified patent and that said Letters Patent is hereby corrected as shown below:

In the Claims:

Claim 11, Column 6, Line 8 should read:

have a diameter of about 0.03 to 0.3 inches greater than a diameter

Claim 18, Column 6, Line 44 should read:

apertures have a diameter of about 0.03 to 0.3 inches greater than a

Signed and Sealed this  
Twenty-eighth Day of April, 2015

Michelle K. Lee  
*Director of the United States Patent and Trademark Office*